United States Patent [19]

Miyazaki et al.

[11] 4,436,710

[45] Mar. 13, 1984

[54] METHOD OF MANUFACTURING POTASSIUM SULFATE

[75] Inventors: Naomi Miyazaki, Tokyo; Akira Fujimura, Yono, both of Japan

[73] Assignee: Onoda Chemical Industry Co., Ltd., Tokyo, Japan

[21] Appl. No.: 405,726

[22] Filed: Aug. 6, 1982

[30] Foreign Application Priority Data

Mar. 19, 1982 [JP]  Japan .................................. 57-44168

[51] Int. Cl.³ .......................... C01B 7/01; C01D 5/02
[52] U.S. Cl. .................................... 423/552; 423/482
[58] Field of Search ........................ 423/552, 482, 481

[56] References Cited

U.S. PATENT DOCUMENTS

| | | | |
|---|---|---|---|
| 2,275,825 | 3/1942 | Lewis | 423/482 |
| 2,706,145 | 4/1955 | Cannon | |
| 2,762,689 | 9/1956 | Giraitis et al. | 423/482 |
| 3,563,701 | 2/1967 | Cannon | |
| 3,687,639 | 8/1972 | Barlow et al. | 423/552 |
| 3,998,935 | 12/1976 | Adams et al. | 423/552 |
| 4,045,543 | 8/1977 | Sardisco | |
| 4,342,737 | 8/1982 | Iwashita et al. | 423/482 |

FOREIGN PATENT DOCUMENTS

| | | |
|---|---|---|
| 32-2666 | 4/1957 | Japan . |
| 42-27246 | 3/1967 | Japan . |
| 51-2699 | 1/1976 | Japan .................................. 423/552 |
| 55-90488 | 7/1980 | Japan . |

Primary Examiner—Gary P. Straub
Attorney, Agent, or Firm—Frishauf, Holtz, Goodman & Woodward

[57] ABSTRACT

This improved method comprises a first dry step of reacting concentrated sulfuric acid and potassium sulfate with potassium chloride at about 300° C. in a slurried state to obtain a mixed slurried salts of $K_nH_{2-n}SO_4$ (n being 1.3 to 1.4); a second wet step of dissolving said mixed salts and additional raw potassium chloride in water, the amount of water being limited to some extent, heating the solution to 60° to 90° C. in order to take place a wet reaction, and cooling the solution to 50° to 20° C. to deposit potassium sulfate crystals from the solution in order to obtain the final product and filtrate; and a third circulating step of evaporating the filtrate to obtain a cake of mixed salts of acid potassium sulfate and potassium chloride, and returning circulatingly the cake to the first stage as part of raw materials.

4 Claims, 3 Drawing Figures

METHOD OF MANUFACTURING POTASSIUM SULFATE

BACKGROUND OF THE INVENTION

This invention relates to a method of manufacturing potassium sulfate, particularly of the type applied as an artificial fertilizer, by reaction between potassium chloride and sulfuric acid.

Potassium chloride is widely used as a potash fertilizer. In Japan, about one million tons per year of potassium chloride are consumed, and the total quantity thereof is imported from abroad. Though more expensive than potassium chloride, potassium sulfate is more preferably applied, because the presence of chlorine ion in the soil is detrimental to the production of tobacco and potato or other horticultural plants. Further, where a compound fertilizer is manufactured, the mixture of potassium chloride with ammonium nitrate tends to give rise to an explosion. For these reasons, potassium sulfate is used partly instead of potassium chloride. In Japan, about three hundred thousand tons per year of potassium sulfate are consumed. Substantially the whole quantity of said potassium sulfate is imported from abroad, and a very small amount of potassium sulfate is domestically manufactured.

Manufacture of fertilizer type potassium sulfate from raw potassium chloride has long been carried out by the process of mixing a chemically equivalent amount of concentrated sulfuric acid with raw potassium chloride, and heating the mixture for many hours at a high temperature of 500° to 600° C. to cause thermal decomposition expressed by the following chemical equation (1).

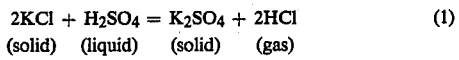

Thus, agglomerate potassium sulfate and gaseous hydrogen chloride can be obtained.

The above-mentioned process is a classic one closely resembling the former stage of the Leblanc soda process developed about 100 years ago.

This process has a drawback that the reaction apparatus is tremendously corroded by the high temperature hydrogen chloride gas released from the reaction. Further, heat conduction from the muffle furnace to the mixture of raw materials is not good so that the reactor must occupy a large volume and the mechanical operation of the furnace becomes very difficult. Therefore, this process leads to heavy losses in thermal and mechanical energy, unfavorably consuming considerable plant and operation costs.

The solid phase reaction applied in this process proceeds at a lower velocity than the reaction in an aqueous solution, making it very difficult to reduce the content of impurity. By this process, it is ordinarily impossible to reduce the content of residual chloride ion content to less than 3 weight% in the produced potassium sulfate. If it is attempted to decrease the quantity of residual chloride ion to about 1 weight%, the reaction temperature should be raised up to about 800° C., resulting in far greater difficulties.

Heretofore, a number of inventions have been developed in order to improve the process of manufacturing potassium sulfate from potassium chloride and concentrated sulfuric acid. These inventions can be classified definitely into two kinds, that is, a completely dry thermal decomposition process and a completely wet double decomposition process.

An improvement on the aforementioned classical dry process is set forth in Japanese Patent Application Publication No. 2666/1957. According to this invention, the reaction expressed by the chemical equation (1) is undertaken in the following two stages expressed by the equations (2) and (3) given below.

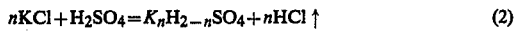

(where n is taken to denote 1.3 to 1.4)

The dry thermal reaction of the first stage (2) terminates in 1 to 3 hours with the temperature kept at a low level of about 250° C. A semimolten mass obtained by the reaction (2) is solidified by cooling, and then the mass is crushed into powdery particles having a size of about 60 mesh. Afterwards, the second stage (3) of the dry thermal reaction is finished in 1 to 3 hours with the temperatue kept at a level ranging from 400° to 500° C.

The above-mentioned improved process is characterized in that a lower reaction temperature is applicable than in the previously described classical one stage process based on the equation (1) as a whole, and the content of residual chloride ion in the product can be somewhat reduced. However, this improved process is still accompanied with the drawbacks that a semimolten mass should be solidified by cooling when the first stage reaction is shifted to the second stage reaction, and the solidified mass should be finely pulverized with great difficulties. The pulverized mass has to be heated again to a high temperature, and tends to be fused into an agglomerated mass. Thus, this developed process offers little advantage over the aforementioned classical process.

The process set forth in Japanese published unexamined patent application No. 90488/1980 is characterized in that, when the dry one stage reaction of the equation (1) is carried out, the concentrated sulfuric acid is applied at such an excessively large equivalent ratio as 1.07 to 1.40 times (preferably 1.1 to 1.3 times) the content of potassium chloride. By this process, the reaction can be finished in about 2 hours with the temperature kept at a relatively low level of about 400° C., obtaining apparently dry product of potassium sulfate containing acid potassium sulfate. Further, the product contains residual chloride ion of less than 1 weight%.

The product of this process, however, contains an excess amount of sulfuric acid, making the product acidic. This acidic product can not be used as such as a fertilizer. The acidic product can be used only as a raw material of compound fertilizer production. If the acidic product is neutralized by a common alkaline agent, the neutralized product can be used as a fertilizer. However, the application of an expensive alkaline agent tends to raise the cost of the product, and moreover undesirably reduces its purity.

The processes disclosed in U.S. Pat. Nos. 2,706,145 and 3,563,701 are characterized in that the muffle furnace is replaced by a specially designed fluidized bed furnace having a high thermal efficiency. After all, these processes are nothing but the aforesaid one stage dry reaction type. Moreover, the products of these processes have an unsatisfactory purity ranging from 95 to 97%. Further, these processes are indeed applicable to the manufacture of sodium sulfate, but are unadapted for the manufacture of potassium sulfate, because the fluidized bed of the latter tends to coagulate.

Next, with regard to wet process, U.S. Pat. No. 4,045,543 comprises the steps of reacting 2 mols of KCl with 1 mol of H₂SO₄ in a medium of water at a temperature of 65° to 120° C. in accordance with the undermentioned chemical equation of (4),

$$2KCl + H_2SO_4 = K_2SO_4 + 2HCl \qquad (4)$$

evaporating the produced HCl in the form of an azeotropic mixture with water at a temperature of 90° to 110° C., replenishing the same amount of water as that which has been evaporated, and cooling the resultant solution to crystallize out a product of K₂SO₄. A large amount of potassium salts remain in the solution, and are circulatingly returned to the starting reaction vessel.

However, it has been proved by the present inventors that it is necessary for the above-mentioned process to evaporate such a large amount of water which equals about 9 times the weight of the potassium sulfate product. Obviously, the above-mentioned wet process consumes a far larger amount of fuel than the conventional dry process, not being practically applicable from the economic point of view.

The process set forth in Japanese Patent Application Publication No. 27,246/1967 resembles to that of U.S. Pat. No. 4,045,543 mentioned above. In this process, it has been also proved by the present inventors that it is necessary to evaporate such a large amount of water which equals from about 6 to 11 times the weight of the potassium sulfate product, even if the filtrate is circulatingly returned to the starting reaction vessel.

An error common to the literature of the above-mentioned wet processes arises from the undermentioned illusion. Namely, when a filtrate is concentrated or evaporated, water and hydrochloric acid constitute jointly an azeotropic mixture as in well known. Therefore, it is impossible to separate hydrochloric acid from water by evaporating an aqueous solution of hydrochloric acid. Further, when hydrochloric acid is contained in the solution at a low concentration, substantially steam alone is vaporized, resulting in the extremely small evaporation recovery of hydrogen chloride. On the other hand, when hydrochloric acid is contained in the solution at a high concentration, potassium sulfate and hydrogen chloride contained in the solution give rise to a backward reaction and tend to go back to acid potassium sulfate and potassium chloride. Therefore, hydrochloric acid itself does not indicate so high a partial pressure as does a simple aqueous solution of hydrochloric acid. Even if, therefore, all the content of water is evaporated, it is impossible to recover the whole of the hydrochloric acid which is produced.

Upon ignoring the above-mentioned facts, it has been erroneously believed that, when the recovered filtrate is thermally concentrated, the hydrochloric acid contained in the filtrate can be easily evaporated off. It is actually possible to evaporate off less than 25% of the total of the hydrogen chloride obtained. In all the aforementioned literature of wet process, there is no distinct description of a material balance, concerning the circulating system of recovered filtrate.

As mentioned afore, the present inventors have proved that all the wet processes cited above consume an extremely large amount of fuel used for evaporation of water in the filtrate, and are practically inapplicable from the economical point of view. To date, these wet processes have not been practised in the world. Only the dry process is used.

SUMMARY OF THE INVENTION

This invention has been accomplished in order to eliminate the drawbacks accompanying the aforementioned dry and wet processes of manufacturing potassium sulfate from potassium chloride and sulfuric acid. The present invention has succeeded for the the first time in manufacturing economically and with good yield the potassium sulfate product, containing an extremely small amount of chloride ions, by adopting a dry process as the first stage, a wet process as the second stage, and an effective circulating process of a third stage.

The first and second stages, which are fundamental to the process embodying the present invention, are carried out as follows.

The first stage of the present process is similar to the first stage of the process disclosed in the aforementioned Japanese Patent Application Publication No. 2666/1957, as noted in chemical equation being (2). This first stage comprises the steps of blending concentrated sulfuric acid and acid potassium sulfate with potassium chloride as raw materials in such a manner that the molar ratio of sulfuric acid radical to potassium radical becomes to from 1.0:1.3 to 1.0:1.4, carrying out a dry reaction at a temperature of from 290° to 350° C. with the blended raw materials maintained in a molten or slurry state, and recovering generated hydrogen chloride gas to obtain a mixed salts expressed by $K_nH_{2-n}SO_4$ (where n is taken to denote 1.3 to 1.4 as previously described).

The second stage of the present process resembles the second stae of the process disclosed in the aforementioned Japanese Patent Application Publication No. 2666/1957, as noted in chemical equation being (3). However, the second stage reaction of the present process is carried out in water medium instead of dry state.

Namely, the second of the present process comprises dissolving in a water medium the aforementioned mixed salts $K_nH_{2-n}SO_4$ (that is, $(n-1)K_2SO_4 + (2-n)KHSO_4$) and such amount of raw potassium chloride equal 1.0 to 1.5 times an equivalent amount sufficient to convert said mixed fused salts into potassium sulfate, the amount of said water being so limited as to set the concentration of the aqueous solution of hydrochloric acid obtained by the reaction at 6 to 9%; carrying out the reaction while stirring the resultant solution at a temperature of 60° to 90° C. to crystallize out potassium sulfate; cooling the resultant slurry solution containing crystals of potassium sulfate to a temperature of 50° to 20° C. to additionally crystallize out the potassium sulfate; and filtering out all the crystallized potassium sulfate.

The effective third stage mentioned above comprises evaporating out the filtrate obtained in the second stage to remove water contained therein and obtain mixed crystals of acid potassium sulfate potassium chloride and potassium chloride; and utilizing the resultant crystals as a part of raw materials in the first stage, thereby converting the said crystals into potassium sulfate crystals and hydrogen chloride gas. At the evaporation step, hydrogen chloride contained in the filtrate is evaporated as hydrochloric acid.

At the first stage combined with the third stage, part or the whole of raw sulfuric acid is replaced by the residual acid potassium suflate crystals. At this time, the value of molar ratio of SO₄ to K in the mixed raw materials should be kept to 1.3 to 1.4 by adjusting the amount of potassium chloride which is added.

In the above-mentioned third stage, the water contained in the filtrate can be evaporated off in a small amount equal to 2 to 3 times the weight of product potassium sulfate. For reference, the amount of direct heating fuel in the first stage is far smaller than the fuel consumption in this third stage evaporation.

Potassium sulfate manufactured by the method of this invention contains less than 0.1 weight% of residual chloride, and can be produced with a high yield of more than 98% with respect to the raw potassium chloride.

DETAILED DESCRIPTION OF THE PREFERRED EMBODIMENT

Figure 1:
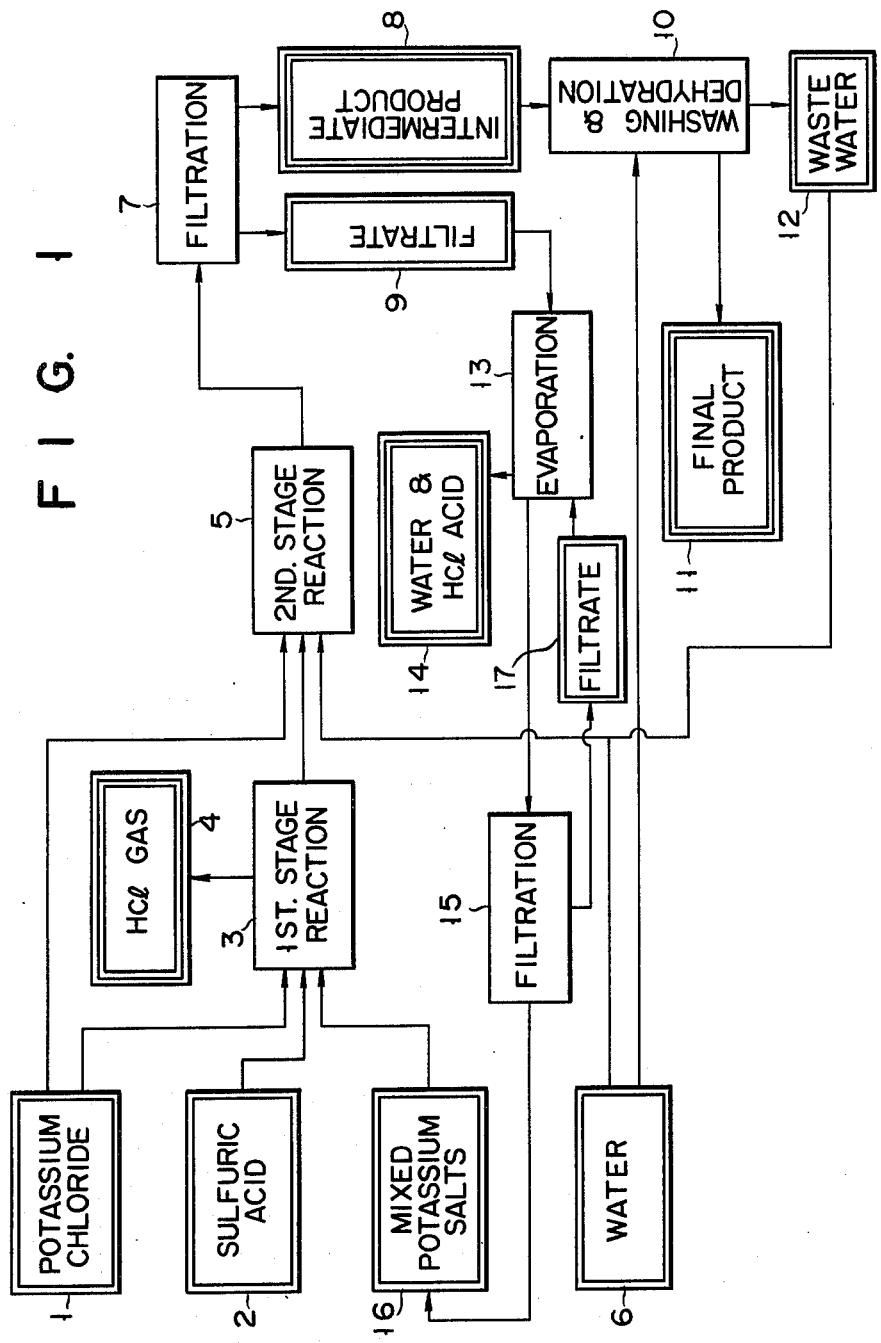
FIG. 1 is a flow chart showing the steps of potassium sulfate manufacturing of this invention.

Detailed description is now given of a process of this invention having the first, second and third stages.

In the first stage, reaction takes place between raw mixed solid salts consisting of acid potassium sulfate, potassium chloride and a small amount of potassium sulfate, which are obtained in the third stage, another raw material of concentrated sulfuric acid and, where necessary, some amount of raw potassium chloride at a moderate temperature of from 290° to 350° C. in a molten or slurry state. The mixing ratio of these raw materials should be selected in such a manner that the molar ratio of SO₄ to K in this raw mixture ranges from 1.0:1.3 to 1.0:1.4. By this reaction, chlorine is removed almost completely in the form of hydrogen chloride gas from the molten or slurry mixture, leaving mixed salts of $K_nH_{2-n}SO_4$ (where n is taken to denote 1.3 to 1.4). The amount of hydrogen chloride gas thus obtained accounts for about 85% of the amount of HCl produced throughout the three stages.

In the second stage, the mixed salts solidified by cooling, and such an amount of raw potassium chloride as equals 1.0 to 1.5 times chemically equivalent amount sufficient to convert said mixed salts into potassium sulfate, are dissolved in water to react with each other, the quantity of water being so controlled as to cause the aqueous solution of hydrochloric acid produced by the reaction to have a concentration ranging from 6 to 9%. Thus, the wet process reaction of second stage is carried out for 30 to 60 minutes with stirring at a temperature of 60° to 90° C., thereby crystallizing out part of the potassium sulfate. Then, potassium sulfate is additionally crystallized out by reducing the solution temperature to a level ranging between 50° to 20° C. Thereafter, all the crystals are filtered out to obtain the desired product.

In the third stage, water is removed from the filtrate by boiling evaporation. By this evaporation, a precipitate of mixed salts consisting of acid potassium sulfate, potassium chloride and a small amount of potassium sulfate is obtained. This precipitate is utilized as a part of raw materials in the first stage as mentioned afore.

When water is evaporated during the third stage, the greater part of HCl contained in the solution reacts with K₂SO₄ contained in the solution. As a result, HCl and K₂SO₄ are converted into KHSO₄ and KCl by backward reaction as indicated by the following formula (5)

$$KHSO_4 + KCl \leftarrow K_2SO_4 + HCl \qquad (5)$$

The HCl remaining in the solution, the amount of which accounts for about 15% of the amount of HCl produced throughout the whole stages,, is recovered when evaporated with water as a solution of hydrochloric acid.

In short, the process of this invention represents a reasonable and effective assembly of the first stage dry process, the second stage wet process and the third stage circulating process. By this three stages process, an industrial potassium sulfate of high purity can be manufactured economically with a high yield.

A further detailed description is given below with the three stages process of this invention referring to the flow sheet of FIG. 1.

Raw potassium chloride 1 of industrial grade having a purity of about 98% and raw concentrated 98% sulfuric acid 2 are blended as starting raw materials in such a manner that SO₄ and K contained in the blended raw materials have a molar ratio of 1.0:1.3 to 1.0:1.4. Alternately, a mixture of concentrated sulfuric acid 2, a mixed salts 16 of acid potassium sulfate and potassium chloride obtained in the third stage of this invention mentioned hereinafter, and, if necessary, fresh potassium chloride 1, are blended as a circulating material in such a manner that SO₄ and K contained in the blended materials have a molar ratio of 1.0:1.3 to 1.0:1.4.

The blended materials are taken into a first stage acid-proof reaction vessel 3 having an agitator, and is heated directly to a temperature of 290° to 350° C. with stirring. In this case, if the molar ratio of SO₄ to K of the blended materials is more than 1.0:1.4, the content in the vessel become very sticky, thereby obstructing good heat transmission and the HCl eliminating facility, both constituting the objects for which this invention is intended. If the acid molar ratio is less than 1.0:1.3, then potassium sulfate crystals cannot be obtained with a high yield at the second stage of the method of this invention.

The raw materials blended in accordance with this invention and the resultant product remain all in a state of molten slurry at a comparatively low temperature, thereby facilitating stirring, and assuring good heat transmission therethrough. Therefore, the dry reaction expressed by the chemical equation (2) proceeds smoothly, giving forth hydrogen chloride gas, and providing mixed salts of KHSO₄ and $K_nH_{2-n}SO_4$, (that is, (n−1)K₂SO₄+(2−n)KHSO₄) where n is taken to denote 1.3 to 1.4.

When mixed salts of acid potassium sulfate and potassium chloride are used as raw materials, SO₄ and K contained in the raw materials should have a molar ratio ranging from 1.0:1.3 to 1.0:1.4. In this case, reaction proceeds in the manner indicated in the following equation (6).

$$(n-1)KCl + KHSO_4 = K_nH_{2-n}SO_4 + (n-1)HCl \qquad (6)$$

(where n is taken to denote 1.3 to 1.4)

Figure 2:
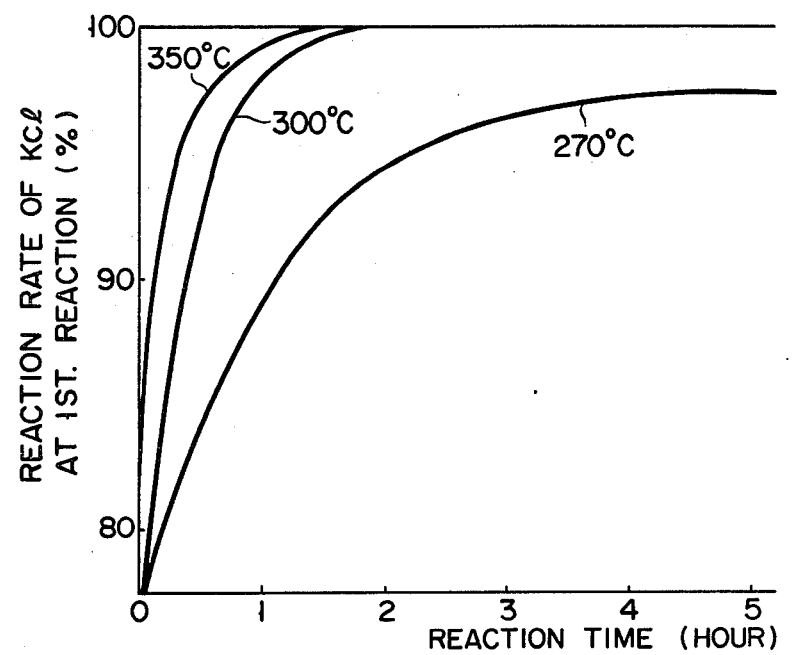
FIG. 2 is a curve diagram showing changes with time in the reaction rate of KCl when raw materials consisting of 1.4 KCl+H₂SO₄ are used in the first stage of the method of this invention, the reaction temperature being set at 270°, 300° and 350° C., respectively.

The curve diagram of FIG. 2 indicates the relationship between temperature and rate of reaction when the fundamental batch process of this invention was carried out. The diagram shows that, at 350° C., the reaction rate reaches 98.5% in an hour, and 99.8% in an hour and a half, whereas, at 300° C. the reaction rate reaches 98.2% in an hour, 99.5% in an hour and a half, and 99.8% in two hours. At a lower temperature than 290° C., the reaction takes place at an exceedingly low rate.

The reason why the highest reaction temperature in the first stage is set at 350° C. is given below. Namely, when the reaction is performed at a higher temperature than 350° C., a side reaction expressed by the following equation (7) rapidly proceeds to suppress the main reaction.

$$2KCl + 2H_2SO_4 = K_2S_2O_7 + 2HCl + 2H_2O \quad (7)$$

Further, the reacted mass loses fluidity and excess energy is wasted. Furthermore, $K_2S_2O_7$ obtained as a by-product exerts an adverse effect on the second stage reaction.

The reason why the lowest reaction temperature in the first stage is chosen to be 290° C. arises from the fact that an industrially available reaction rate has been taken into account with reference to the curve diagram of FIG. 2.

Hydrogen chloride gas 4 released in accordance with the equations (2), (3) and (6) is trapped to be put to any other proper application.

Figure 3:
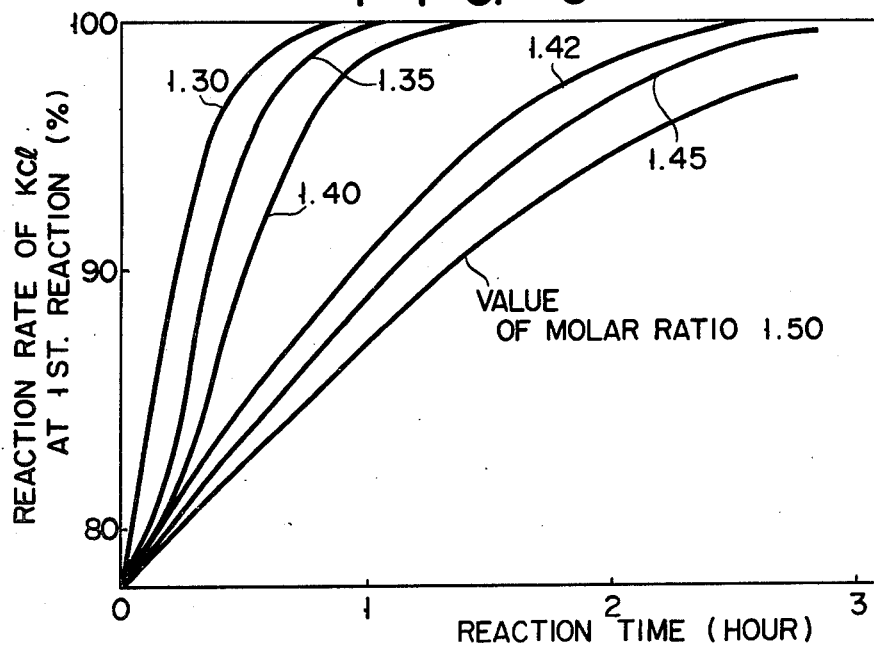
FIG. 3 is a curve diagram showing changes with time in the reaction rate of KCl when the molar ratio of sulfuric acid to potassium chloride is varied in such a manner that K is changed within the range of 1.3 to 1.5 mols per mol of SO₄.

The curve diagram of FIG. 3 indicates the relationship between the value of molar ratio of $H_2SO_4$ to KCl in the first stage reaction on one hand and the reaction rate and time at 300° C. on the other. This curve diagram shows that, when the above-mentioned value of molar ratio falls within the range of from 1.3 to 1.4, the reaction rate reaches substantially 100% in a range of time ranging from 1 to 2 hours, whereas, when the value of molar ratio exceeds the level of 1.4, it is necessary to extend reaction time prominently.

Next, the molten slurry of $K_nH_{2-n}SO_4$ obtained by the dry reaction expressed by the equation (2) or (6) is taken into a second stage reaction vessel 5 immediately or after being cooled. The wet reaction expressed by the equation (3) is carried out by adding a prescribed amount of fresh water 6 and an amount of raw potassium chloride crystals 1 equal to 1.0 to 1.5 times a chemically equivalent quantity sufficient to convert $K_2H_{2-n}SO_4$ of the equation (3) into $K_2SO_4$. The reason why an excess amount of potassium chloride is added to the solution is for the requirement of accelerating the wet reaction and elevating the salting-out effect when potassium sulfate is crystallized out from the solution. The excess part of potassium chloride is later circulated to be used as part of the raw material, and consequently is not wasted at all.

The prescribed amount of water mentioned above has been experimentally determined to enable the reaction expressed by the equation (2) or (6) to be effectively completed with a little amount of water as possible. That is, it has been experimentally confirmed that, when an aqueous solution of hydrochloric acid produced by the reaction has a concentration ranging from 6 to 9%, an optimum result can be assumed. When said concentration takes a value of over 9%, the reaction is not carried out satisfactorily, leading to a decline in the purity of the product potassium sulfate. When said concentration falls below 6%, the yield of product potassium sulfate drops, giving rise to inefficiency of production. In other words, the introduction of the above-defined amount of water into the second stage reaction vessel 5 assumes a smooth progress of reaction in the aqueous solution, thereby obtaining potassium sulfate of high purity with good yield.

The second stage reaction vessel 5 is maintained at a temperature of 60° to 90° C., and the reaction is continued for 30 to 60 minutes with stirring to crystallize out some potassium sulfate. Later, when the temperature is lowered to a level ranging from 50° to 20° C. in 1 or 2 hours, potassium sulfate additionally crystallizes out of the solution. Hydrogen chloride obtained as a by-product in this second stage reaction is dissolved in the liquor medium to provide an aqueous solution of hydrochloric acid.

The intermediate product 8 of potassium sulfate are filtered out in the succeeding filtering step 7. If, in this case, a vacuum filter is applied, the water content of the intermediate product 8 is reduced to 7 to 15% by weight. If, however, dehydration 10 is carried out using a centrifugal separator, it is possible to obtain the final product of potassium sulfate 11 containing only 3 to 5% of water. The purity of the product is comparatively high, the content of residual chlorine being reduced to less than 1.0%. In order to obtain product potassium sulfate of higher purity, it is advised to apply 30 to 100 parts by weight of water or a saturated aqueous solution of potassium sulfate to 100 parts by weight of intermediate potassium sulfate product 8 before the step of dehydration 10, resulting in that the final potassium sulfate 11 containing less than 0.1% of residual chlorine can be obtained. After this washing, the waste water 12 may be drawn out of the system, or may be returned to the second stage reaction vessel 5 in place of fresh water 6 for utilization of a small amount of salts contained in the waste water 12.

The filtrate 9 of the above-mentioned second stage contains not only hydrochloric acid, potassium sulfate and potassium chloride, but also a small amount of impurities contained in the original raw potassium chloride.

Next, in the third stage, the filtrate 9 containing some amount of potassium salts is concentrated by evaporation 13 using a vacuum evaporator, and the evaporated water and hydrochloric acid 14 are recovered suitably. Potassium salts which are crystallized out of the concentrated filtrate are subjected to filtration 15 to recover a cake of the potassium salts 16. The cake 16 is returned to the first stage reaction vessel 3 in the form of a circulating raw material. At this time, filtrate 17 separated by the filtration 15 is brought back to the evaporation step 13. When the cake 16 is returned to the first stage reaction vessel 3, it is necessary to add the proper amount of fresh concentrated sulfuric acid 2 or raw potassium chloride 1 in consideration of the $SO_4$ and K content in said cake of potassium salts 16 in order that the $SO_4$ and K have a molar ratio ranging from 1.0:1.3 to 1.0:1.4.

Description has been given of the first to third stages of the whole circulating cycle of manufacturing potassium sulfate in accordance with the method of this invention. It is possible to operate continuously the respective stages instead of the batch process. In other words, even if each stage is shifted to the succeeding one while the reaction of each stage is not fully brought to the end. The unreacted portions are eventually circulated as mentioned afore, thereby assuring the same result as that realized by the batch process.

The small amount of impurities originally contained in the raw potassium chloride accumulates progressively in the circulating system. Even if these impurities are substantially allowed to remain in the circulating system, the amount of impurities actually carried into the product potassium sulfate is exceedingly small, exerting no harmful effect on the guaranteed potassium content of fertilizer grade potassium sulfate.

The method embodying this invention has the following characteristic merits:

1. In the first dry stage of the process, potassium chloride or mixed salts of acid potassium sulfate and potassium chloride obtained in the third stage and concentrated sulfuric acid are subjected to dry reaction by direct heating in a molten slurry state, thereby facilitating easy stirring and heat transmission. Therefore, the reaction proceeds at a relatively low temperature and is terminated in a short length of time. Accordingly, the subject manufacturing apparatus has a simplified arrangement in respect of the application of corrosion-resistant material, power and fuel, and can be operated easily, offering great economic advantages.

2. In the second wet stage of the process, the amount of water applied is specified, assuming a high yield of product potassium sulfate, and requiring water to be evaporated in the circulation step in an amount only corresponding to 2 to 3 times the weight of the product. In the conventional wet process, water has to be evaporated in as large an amount as 6 to 11 times the weight of the product.

3. The processes of the first and second stages have the characteristic of enabling energy to be more prominently saved than the conventional dry or wet process.

4. The product potassium sulfate has a very high purity. Particularly, the chlorine content of the product can be reduced to such an unprecedently low level as 0.03 to 0.08%.

5. The by-product hydrogen chloride gas has a sufficiently high purity and concentration, and hydrochloric acid can be recovered easily.

EXAMPLES

EXAMPLE 1

Two hundred grams of 98% concentrated sulfuric acid was taken into a separable glass flask of 500 cc capacity. The sulfuric acid was heated to 230° C. in advance. Into the flask, 194 grams of fertilizer grade potassium chloride of 98.5% purity was added in small increments. The molar ratio value of potassium chloride to sulfuric acid was 1.3. With temperature later raised to 300° C., the charged materials were reacted with each other while being agitated for 60 minutes by an anchor type stirring blades.

As a result, 296 grams of a molten slurry was produced with evolution of 93.3 grams of hydrogen chloride gas and 5.0 grams of water vapor. Analysis of this the cooled and crushed slurry showed that the chlorine content accounted for 0.48%, proving that 98.5% of added potassium chloride was reacted.

Then, 296 grams of the slurry obtained was taken into 360 grams of water held in a 1 liter glass beaker. Further, 125 grams of fresh potassium chloride was taken into the beaker. With temperature maintained at 80° C., the whole mixed mass was stirred for 30 minutes, thereby some of potassium sulfate being crystallized out. The additional crystals of potassium sulfate were produced when the whole mass was cooled to 45° C. The total crystals were centrifuged and dried to obtain 125 grams of the product potassium sulfate. In this case, the filtrate indicated acidity corresponding to 8.0% solution of hydrochloric acid.

The product was chemically analyzed to contain 52.88% of $K_2O$, 0.5% of Cl and 0.45% of free sulfuric acid.

EXAMPLE 2

Two kg of 98% sulfuric acid was taken into an acid-resistant reaction vessel of 5 l capacity. The content was heated to 230° C. in advance. Then, 1.94 kg of raw potassium chloride was added in small increments to the sulfuric acid with temperature later raised to 300° C., thereby reaction being carried out in the same manner as in Example 1. The molar ratio value of potassium chloride to sulfuric acid was 1.3.

As a result, 2.95 kg of molten slurry was produced with evolution of 0.93 kg of hydrogen chloride gas and 0.05 kg of water vapor. The material obtained by cooling and crushing said slurry was analyzed to contain 0.48% of chlorine, proving that 98.5% of the added potassium chloride was reacted.

Next, 2.95 kg of the molten slurry was taken into water of 3.6 kg held in a second stage reaction vessel of 10 l capacity. The mixture was kept at a temperature of 80° C. for 30 minutes with stirring. Then, 1.25 kg of raw potassium chloride was added to the mixture to take place the wet reaction. With temperature maintained at 80° C., the mixture was reacted with 30 minutes agitation to crystallize out part of potassium sulfate. With temperature reduced to 45° C., the crystallization of potassium sulfate was further increased.

After separating the crystallized potassium sulfate from the mother liquor by filtration, the crystals were washed with one liter of saturated potassium sulfate water solution. After drying, 1.23 kg of product potassium sulfate was obtained. The product was chemically analyzed to contain 53.9% of $K_2O$, 0.06% of Cl and 0.15% of free sulfuric acid.

On the other hand, 6.6 kg of filtrate was obtained. The filtrate was analyzed to indicate acidity corresponding to 8.0% solution of hydrochloric acid, and was proved to contain therein 16.32% of potassium (K).

This filtrate was concentrated by evaporation to separate a precipitate. After the substantially whole water contained in the filtrate was evaporated out, 2.7 kg of cake, containing 5% of moisture, was obtained. Since this cake was a mixture of acid potassium sulfate, potassium chloride and a small amount of potassium sulfate, the cake could be applied as part of the raw material when returned to the first stage dry reaction vessel.

As measured from 3.6 kg of water taken into the second stage wet reaction vessel, it was proved that the amount of evaporated water corresponds to 2.9 times 1.23 kg of the product potassium sulfate.

EXAMPLE 3

Two kg of 98% concentrated sulfuric acid was taken into an acid-resistant first stage dry reaction vessel of 5 l capacity. The sulfuric acid was heated to 230° C. in advance. Then, 1.50 kg of industrial grade raw potassium chloride of 98% purity was added to the sulfuric acid. With temperature later raised to 300° C. by direct heating, 0.52 kg of the raw potassium chloride was additionally added, the total amount of potassium chloride added being 2.02 kg. The reaction was carried out in the same manner as in Example 1. As a result, 3.00 kg of molten slurry was obtained with evolution of 0.97 kg of hydrogen chloride gas and 0.05 kg of water vapor. The value of molar ratio of potassium chloride used to the sulfuric acid used was 1.3. The material obtained by cooling and crushing said molten slurry was analyzed to contain 0.45% of chlorine, proving that 98.5% of the raw potassium chloride was reacted with sulfuric acid.

Next, 3.00 kg of the molten slurry thus obtained was dissolved into 3.5 kg of water held in a second stage wet reaction vessel of 10 l capacity. The solution reacted for 30 minutes with agitation at a temperature of 80° C., obtaining some part of potassium sulfate precipitation. Then, 2.00 kg of fresh potassium chloride was added to the solution, and reaction was continued for further 30 minutes at the same temperature as above, obtaining additional part of potassium sulfate was precipitated. After the temperature was lowered to 45° C., further additional amount of potassium sulfate was precipitated. The total amount of precipitated substance was separated from the mother liquor by filtration, obtaining 5.70 kg of filtrate. The filtrate was analyzed to indicate acidity corresponding to 7.8% solution of hydrochloric acid, and was proved to contain therein 16.43% of potassium (K).

The filtered cake was washed in a same manner as in Example 2. After drying the washed cake, 1.41 kg of the product potassium sulfate was obtained. The product contained 53.89% of $K_2O$, 0.05% of Cl and 0.23% of free sulfuric acid.

Lastly, the filtrate was evaporated in the same manner as in Example 2, obtaining 2.5 kg of cake containing 5% of moisture. This cake was returned to the first stage dry reaction vessel in the same manner as in Example 2.

As measured from 3.5 kg of water taken into the second stage wet reaction vessel, it was proved that the amount of evaporated water corresponds to 2.5 times 1.41 kg of the product potassium sulfate.

EXAMPLE 4

First, 824 grams per hour of 98% sulfuric acid and 2,848 grams per hour of mixed materials consisting of 70 grams of raw potassium chloride and 2,778 grams of the later described circulating salts cake were taken continuously into a stirring blade type acid-resistant dry reaction vessel of 2 capacity provided with a continuous discharge outlet. The above-mentioned circulating salts cake consisted of 56.2% of $KHSO_4$, 36.3% of KCl, 2.5% of $K_2SO_4$ and 5.0% of water. The charged mass reacted at 300° C. by direct heating with agitation by setting an average residence time at 60 minutes. As a result, 3,005 grams per hour of molten slurry was produced with evolution of 667 grams per hour of hydrogen chloride gas having a purity of 76.6%. K contained in the mixed raw materials used in this reaction had a value of molar ratio of 1.35 to $SO_4$ contained therein.

Next, the molten slurry thus obtained was taken continuously into the second stage wet reaction vessel of 5 l capacity provided with agitating blades. Simultaneously, 2,100 grams per hour of water, 1,600 grams per hour of the later described waste liquor used for washing and 1,164 grams per hour of fresh potassium chloride were introduced into the vessel continuously. Thus, the second stage wet reaction was carried out with agitation at 80° C. with average residence time of 60 minutes. The reacted mass was carried into a succeeding vessel continuously, where the mass was cooled to 45° C. in order to crystallize out the potassium sulfate produced. The crystals obtained were filtered, producing 1,650 grams per hour of wet cake of potassium sulfate and 6,200 grams per hour of filtrate. The filtrate indicated an acidity corresponding to that of 7.9% solution of hydrochloric acid.

The wet cake thus obtained was washed with 1,400 grams per hour of water continuously, obtaining 1,509 grams per hour of pure cake containing 4.5% of moisture and 1,600 grams per hour of waste water used for washing. By drying this wet cake, 1,440 grams per hour of the product potassium sulfate was obtained continuously. The product was chemically analyzed to contain 53.80% of $K_2O$, 0.08% of Cl and 0.10% of free sulfuric acid.

The above-mentioned waste water used for washing was returned to the second stage reaction vessel as mentioned before. On the other hand, 6,200 grams per hour of the filtrate was vaporized by a thickener to obtain 2,280 grams per hour of circulating cake with evolution of 3,420 grams per hour of evaporated gas containing 97.5% of water vapor and 2.5% of hydrogen chloride gas. This cake was used in the first stage reaction as part of raw materials circulatingly.

In this case, water was evaporated in an amount corresponding to 2.4 times the weight of produced potassium sulfate.

What we claim is:

1. A method of manufacturing potassium sulfate which comprises:

the first dry step consisting of heating raw materials prepared by mixing concentrated sulfuric acid and recycled mixed cake from the third step, said cake consisting essentially of $K_2SO_4$, $KHSO_4$ and KCl, with at most addition of only a minor portion of non-recycled KCl, wherein the $SO_4$ contained in the mixed raw materials has a molar ratio to K contained therein ranging from 1.0:1.3 to 1.0:1.4, at a temperature of from 290° to 350° C. to form mixed salts of $KHSO_4$ and $K_2SO_4$ in a molten slurry state, the amount of $H_2SO_4$, $K_2SO_4$, $KHSO_4$ and KCl being sufficient to produce said mixed salts which have the composition $K_nH_{2-n}SO_4$ wherein n=1.3–1.4; and recovering the major portion of the total chloride values added in the overall process as hydrogen chloride gas which is evolved;

the second wet step consisting of dissolving said (i) mixed salts and (ii) additional non-recycled KCl, into water, the amount of said additional non-recycled KCl being 1.0 to 1.5 times the chemically equivalent amount which is sufficient to change the $KHSO_4$ in said mixed salts into potassium sulfate, and the amount of said water being such that the aqueous solution of hydrochloric acid produced by the reaction of said second step has a concentration ranging from 6 to 9%; heating the solution to a reaction temperature of from 60° to 90° C. to form additional $K_2SO_4$ and to precipitate potassium sulfate crystals; cooling the reacted solution to a temperature of from 50° to 20° C. to precipitate additional potassium sulfate crystals; and filtering said solution to remove crystals of potassium sulfate which are recovered as the final product and to obtain a filtrate; and the third circulating step consisting of evaporating said filtrate to obtain a mixed cake of $K_2SO_4$, KHSO$_4$ and KCl; and recycling said mixed cake to the first step to be used as part of said raw materials.

2. The method of claim 1 wherein said raw materials are heated in said first step by direct heating.

3. The method of claim 2 wherein the water in the filtrate which is evaporated in the third step is about 2–3 times the weight of said potassium sulfate product.

4. The method of claim 1 wherein the water in the filtrate which is evaporated in the third step is about 2–3 times the weight of said potassium sulfate product.

* * * * *